US008960649B2

(12) United States Patent
Bellandi

(10) Patent No.: US 8,960,649 B2
(45) Date of Patent: Feb. 24, 2015

(54) JOYSTICK CONTROL FOR BACKPACK SPRAYER

(75) Inventor: Carlos Alberto Fleury Bellandi, Terras de São José—Itú (BR)

(73) Assignee: Guarany Indústria e Comércio Ltda., Itú, SP (BR)

( * ) Notice: Subject to any disclaimer, the term of this patent is extended or adjusted under 35 U.S.C. 154(b) by 786 days.

(21) Appl. No.: 13/165,438

(22) Filed: Jun. 21, 2011

(65) Prior Publication Data
US 2012/0025406 A1 Feb. 2, 2012

(30) Foreign Application Priority Data

Jul. 29, 2010 (BR) ................................. 9001361 U

(51) Int. Cl.
*B01F 3/04* (2006.01)
*B05B 12/00* (2006.01)
*B05B 9/08* (2006.01)

(52) U.S. Cl.

CPC ................ *B05B 12/002* (2013.01); *B05B 9/08* (2013.01)
USPC ................. 261/78.2; 261/5; 261/66; 74/523; 239/154

(58) Field of Classification Search

CPC ............................... B05B 9/08; B05B 12/002
USPC ........... 261/5, 62, 66, 78.2; 74/491, 523, 525; 239/154
See application file for complete search history.

(56) References Cited

U.S. PATENT DOCUMENTS

| | | | | |
|---|---|---|---|---|
| 5,873,284 | A * | 2/1999 | Stegall et al. | 74/525 |
| 6,431,024 | B1 | 8/2002 | Yuasa et al. | |
| 7,100,540 | B2 * | 9/2006 | Vaughan | 122/40 |
| 7,866,571 | B2 | 1/2011 | Muller et al. | |
| 2011/0048162 | A1 * | 3/2011 | Miura et al. | 74/523 |

FOREIGN PATENT DOCUMENTS

| | | | |
|---|---|---|---|
| EP | 1297896 | A2 | 4/2003 |
| JP | 2005-118674 | A1 | 5/2005 |
| JP | 4181474 | B2 | 11/2008 |
| JP | 2009018236 | A | 1/2009 |
| MX | 9601200 | A | 3/1997 |
| WO | 9523649 | A1 | 9/1995 |

* cited by examiner

*Primary Examiner* — Charles Bushey
(74) *Attorney, Agent, or Firm* — Duane Morris LLP

(57) ABSTRACT

A joystick control is coupled to an air discharge pipe (9) of a motorized backpack sprayer for controlling flow of liquid to an atomizer, the air discharge speed, and for aiming the discharge pipe. A handle (5) carries a filter (11) that can be accessed and cleaned, even with a full reservoir, by closing a fluid stop valve (12) and releasing the handle (5). Fluid flow to the atomizer is controlled (open/closed) by a control lever (6) that releases the flow of fluid through a fluid valve (13) when pressed, and closes the valve (13) automatically by a spring when released. A locking lever (8) can lock valve (13) open or closed. An engine throttle lever (7) is lateral to the valve (13) and an electrical on/off switch (4) is next to the lever (7).

12 Claims, 1 Drawing Sheet

JOYSTICK CONTROL FOR BACKPACK SPRAYER

Figure 1:
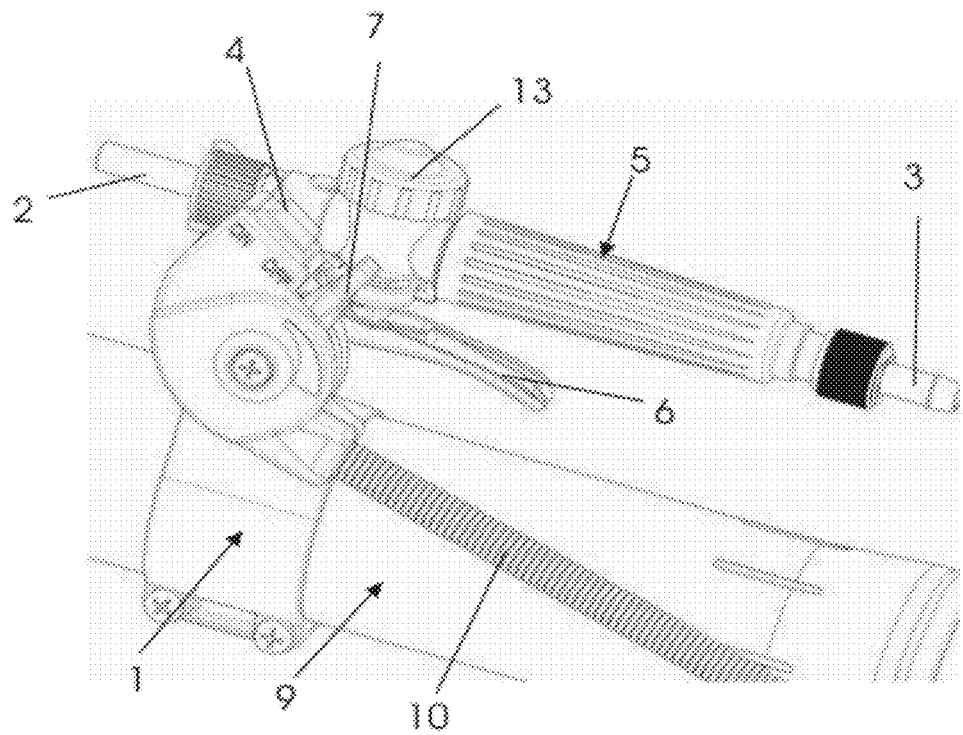
Figure 2:
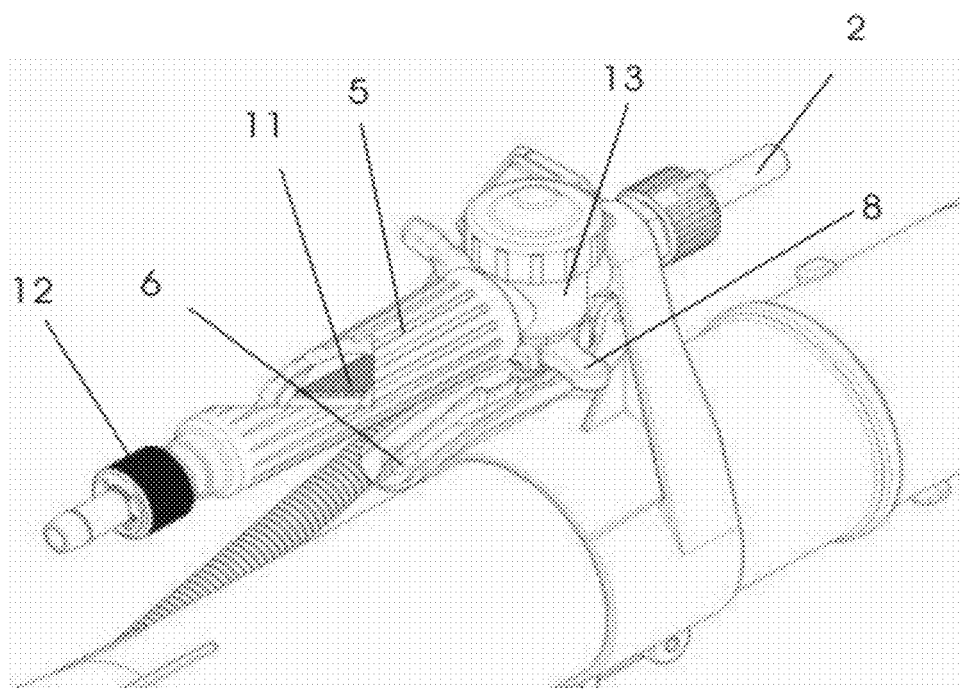

The invention relates to a joystick manual control device for controlling the basic functions of a motorized backpack sprayer to obtain safe and correct operation (for the benefit of the operator and the environment).

Motorized backpack sprayers are used for spraying/atomizing liquids for pest and disease control in agriculture, as well as for controlling vectors of endemic diseases in public health. A backpack engine blows air through an air discharge pipe and over a spray/atomizer nozzle to a discharge.

By means of the present device, the operator can control: the speed of the engine, immediate stopping of the engine by a switch, and the flow of fluid to the spray/atomizer nozzle. Control functions are built on a joystick control that can be coupled to the discharge pipe of the motorized backpack sprayer in working position and visible to the operator, so that the joystick control can be easily manipulated with one hand and the backpack sprayer operated with better ergonomics and safety during the application of phytosanitaries/household cleaning products, etc.

DESCRIPTION OF THE PRIOR ART

Generally, the routine work of operating manual backpack sprayers/atomizers tends to be laborious and therefore can generate fatigue and risk to the operator. This can be due to: working while exposed to bad weather, carrying the unit weighing up to about 30 kg, working with toxic chemicals, and at the same time, having to keep track of various operations. The operations include controlling the direction of the air jet discharge so as to aim the chemical at the target to be reached, and moving the discharge at a speed over a pathway that applies the right dose of product per unit of area (previously calibrated). The operator starts and stops the flow of the fluid product into the air discharge to avoid wasting the product and to avoid applying amounts above those permitted by law, which otherwise could cause problems of food, environmental and operator contamination (as well as waste of the fluid product). The operator also may control the speed of the air discharge by the power applied by the motor of a motorized sprayer.

Based on the problems outlined above, it is desirable to configure the machine so as to concentrate operational controls together in a comfortable position and to reduce the need for applying excessive physical force to perform necessary operations (both for large and small equipment). Doing so can improve work quality, safety and productivity, meet the demands of consumers, comply with laws and strengthen the brand in the market. Given this evolutionary process in the area of spraying equipment, control configurations with joysticks facilitate work operations and are key to improving the machinery.

According to Murrel (1979), a joystick is a lever that works in two dimensions and is used for simultaneous and continuous control in two dimensions, or for multiple operations.

Nowadays, there are some versions of joysticks available on the market of manual motorized equipment to spray/atomize liquid. There are those that integrate a large number of functions (such as joysticks from the Italian manufacturer Agrimondo®), others with few functions (such as joysticks from the Turkish manufacturer Taral®—having control of engine speed and a button to stop the engine). There are also equipment configurations that are not controlled with a joystick and, therefore, have the controls located in different positions on the equipment.

Generally, even control configurations with a joystick have controls located on a vertical lever which, despite having a tilt adjustment, makes it difficult to work when there is the need for frequently moving the discharge pipe of the equipment up and down. One cannot work with more than one tilt of a lever at the same time, and the configuration can cause injuries like RSI (repetitive strain injury) in a shorter period of use in comparison to a joystick with controls located like the one that is claimed herein.

In addition to this advantage, the model presented herein stands out for its simplicity in setting its functions in motion, which impacts positively on aspects of quality and safety in the application discussed above. Simplicity is an important aspect in the countries of South America, Africa and some Asian regions, where the workforce, especially in agriculture, is still characterized by the use of people with a low educational level.

Finally, the present joystick has a distinct design, which like the strengths of its components and the low complexity of assembly (unlike, for example, the joysticks of the prior art), provides the system with the advantages, respectively, of low maintenance and high durability.

BRIEF DESCRIPTION OF THE DRAWINGS

The present model will be then more briefly described based on an execution example represented in the drawings. The figures show:

FIG. 1 is a partial perspective view along the air discharge pipe of a backpack sprayer showing the joystick of the present invention.

FIG. 2 is a partial perspective view as in FIG. 1 from a different angle, showing the joystick of the invention.

DETAILED DESCRIPTION

As can be seen from FIG. 1, the control device (joystick) basically comprises a body (1) that has a lower end adapted to couple with an air discharge pipe (9) of a motorized backpack sprayer. One pipe end is a fluid inlet (3) to couple with a hose connected to a reservoir of chemicals (not shown) and another pipe end is a fluid outlet (2) to couple with a hose connected to the nozzle of an atomizer. A conduit (10) contains a throttle cable and switch wires connected to the engine and to the atomizer.

The joystick is also provided with a housing for a filter (11) inside a handle (5). This filter (11) can be easily accessed and cleaned, even with a full reservoir, by closing a stop valve (12) and releasing the handle (5).

The flow is controlled (open/closed) by means of a valve (13) mounted on an upper body (1), between the handle (5) and the fluid outlet (2). A control lever (6) releases the flow of fluid when pressed, and closes the valve (13) automatically by the action of a spring (not shown) when released.

On the side shown in FIG. 2, a smaller lever (8) is provided that locks the valve (13) in either the closed or the open position.

The ability to lock valve (13) in the closed position is an important feature for the operator's safety. The locking lever (8) ensures that the valve (13) does not open accidentally.

The mechanism of the throttle enables the engine to be set at the desired working speed by moving a lever (7) positioned laterally of the valve (13).

Additionally, an electrical switch (4) is mounted in the upper part, next to a lever (7), which can quickly switch off the engine.

An exemplary embodiment having been described, it should be understood that the scope of the invention covers other possible variations, being defined by the elements of the claims appended hereto, including possible equivalents.

The invention claimed is:

1. A joystick for controlling a motorized backpack sprayer having an atomizer nozzle for releasing fluid from a reservoir of chemicals into a discharge pipe through which an engine forces air, the joystick comprising:
   a body (1) with an end adapted to couple to the air discharge pipe (9) of the motorized backpack sprayer;
   a fluid inlet (3) configured for coupling by a hose to the reservoir of chemicals, and a fluid outlet (2) configured for coupling to the atomizer nozzle;
   a conduit (10) carrying controls leading from the joystick to the engine;
   a housing for a fluid filter (11) inside a joystick handle (5);
   a stop valve (12) operable to close the fluid inlet (3), whereby the fluid filter (11) can be accessed even with a full reservoir, by closing the stop valve (12) and releasing the joystick handle (5);
   a fluid valve (13) operable manually to release or to stop a flow of the fluid;
   a lock operable for holding the fluid valve (13) in one of an open and closed position; and,
   at least one of a lever and a switch coupled to the controls leading from the joystick to the engine, for selecting a speed of operation of the engine.

2. The joystick of claim 1, wherein the controls to the engine include a throttle cable and electrical switch wires.

3. The joystick of claim 1, wherein the fluid valve (13) is mounted on an upper part of the body (1), between the handle (5) and the fluid outlet.

4. The joystick of claim 3, wherein the fluid valve (13) comprises a control lever (6) that releases the flow of the fluid when pressed, and closes the valve (13) by the action of a spring when released.

5. The joystick of claim 1, wherein the lock operable for holding the fluid valve (13) in one of the open and closed position comprises a lever (8) that can fix the valve (13) closed, against accidental opening.

6. The joystick of claim 5, wherein the lock operable for holding the fluid valve (13) comprises a lever (8) that is smaller than the control lever (6) and is located laterally of the control lever (6).

7. A motorized backpack sprayer for releasing fluid from a reservoir of chemicals through an atomizer nozzle into a flow of air driven by an engine, comprising:
   a discharge pipe arranged for carrying the flow of air;
   a joystick control carried on the discharge pipe a body (1) with an end adapted to couple to the air discharge pipe (9) of the motorized backpack sprayer;
   a fluid inlet (3) configured for coupling by a hose to the reservoir of chemicals, and a fluid outlet (2) configured for coupling to the atomizer nozzle;
   a conduit (10) carrying controls leading from the joystick to the engine;
   a housing for a fluid filter (11) inside a joystick handle (5);
   a stop valve (12) operable to close the fluid inlet (3), whereby the fluid filter (11) can be accessed even with a full reservoir, by closing the stop valve (12) and releasing the joystick handle (5);
   a fluid valve (13) operable manually to release or to stop a flow of the fluid;
   a lock operable for holding the fluid valve (13) in one of an open and closed position; and,
   at least one of a lever and a switch coupled to the controls leading from the joystick to the engine, for selecting a speed of operation of the engine.

8. The motorized backpack sprayer of claim 7, wherein the controls to the engine include a throttle cable and electrical switch wires.

9. The motorized backpack sprayer of claim 8, wherein the fluid valve (13) is mounted on an upper part of the body (1), between the handle (5) and the fluid outlet.

10. The motorized backpack sprayer of claim 9, wherein the fluid valve (13) comprises a control lever (6) that releases the flow of the fluid when pressed, and closes the valve (13) by the action of a spring when released.

11. The motorized backpack sprayer of claim 7, wherein the lock operable for holding the fluid valve (13) in one of the open and closed position comprises a lever (8) that can fix the valve (13) closed, against accidental opening.

12. The motorized backpack sprayer of claim 11, wherein the lock operable for holding the fluid valve (13) comprises a lever (8) that is smaller than the control lever (6) and is located laterally of the control lever (6).

\* \* \* \* \*